(12) United States Patent
Cheon et al.

(10) Patent No.: US 7,737,374 B2
(45) Date of Patent: Jun. 15, 2010

(54) INPUT DEVICE AND MOBILE COMMUNICATION DEVICE HAVING SAME

(75) Inventors: Jee Young Cheon, Seoul (KR); Kyung Ik Lee, Kwangmyung-si (KR)

(73) Assignee: LG Electronics Inc., Seoul (LR)

( * ) Notice: Subject to any disclaimer, the term of this patent is extended or adjusted under 35 U.S.C. 154(b) by 458 days.

(21) Appl. No.: 11/770,545

(22) Filed: Jun. 28, 2007

(65) Prior Publication Data
US 2008/0202898 A1   Aug. 28, 2008

(30) Foreign Application Priority Data
Feb. 27, 2007   (KR) ...................... 10-2007-0019735

(51) Int. Cl.
*H01H 9/00* (2006.01)
(52) U.S. Cl. ..................... 200/5 R; 200/6 A; 200/17 R; 200/18
(58) Field of Classification Search ..................... 200/4, 200/5 R, 6 A, 17 R, 18; 341/20–22, 32–35; 345/156, 157, 160–162, 168, 169, 184; 455/90.3, 455/556.2, 575.1, 575.2
See application file for complete search history.

(56) References Cited

U.S. PATENT DOCUMENTS

| | | | | |
|---|---|---|---|---|
| 4,866,221 A | * | 9/1989 | Obermann et al. | .......... 200/5 R |
| 5,012,230 A | * | 4/1991 | Yasuda | ........................ 345/160 |
| 5,412,165 A | * | 5/1995 | Malone et al. | .............. 200/5 R |
| 6,340,800 B1 | * | 1/2002 | Zhai et al. | .................... 200/5 R |
| 6,410,866 B1 | * | 6/2002 | Klein et al. | .................. 200/5 R |
| 6,694,236 B2 | * | 2/2004 | Onodera | ...................... 701/36 |
| 7,373,229 B2 | * | 5/2008 | Szczerba et al. | .............. 701/36 |
| 7,429,978 B2 | * | 9/2008 | Yoshioka | .................... 345/169 |
| 7,436,398 B2 | * | 10/2008 | Yuasa et al. | .................. 345/184 |
| 7,518,745 B2 | * | 4/2009 | Guerraz et al. | ............. 358/1.15 |

* cited by examiner

*Primary Examiner*—Michael A Friedhofer
(74) *Attorney, Agent, or Firm*—Birch, Stewart, Kolasch & Birch, LLP

(57) ABSTRACT

An input device is provided. The input device includes a first input unit configured to provide at least two directional signals, a second input unit located in the first input unit, the second input unit being configured to provide at least two directional signals different from the at least two directional signals of the first input unit, and a circuitry supporting substrate configured to receive a signal that is input through the first input unit and the second input unit. In addition, a mobile communication device having an input device is also provided.

20 Claims, 8 Drawing Sheets

INPUT DEVICE AND MOBILE COMMUNICATION DEVICE HAVING SAME

CROSS REFERENCE TO RELATED APPLICATIONS

This application claims the benefit of Korean Application No. 10-2007-0019735, filed Feb. 27, 2007, and is herein incorporated by reference.

BACKGROUND OF THE INVENTION

1. Field of the Invention

The present invention relates generally to an input device and to a mobile communication having the same, and more particularly, to an input device having two input units and a mobile communication device having the same.

2. Description of Related Art

In general, a mobile communication device includes a mobile phone, a Personal Digital Assistant (PDA), and a mobile PC, and may be an advanced communication appliance that can perform various computer works through a network connection as well as wireless communication independent of location.

Nowadays, the mobile communication device has various additional functions such as the capability to perform an Internet search, play a game, and send/receive E-mail in addition to a communication function for transferring a voice. Accordingly, the mobile communication device has a navigation key that functions as a direction key for enabling a user to easily use various additional functions.

However, in order to move a curser to a desired position using a conventional button type navigation key, the user is required to perform many repeated operations, and it is inconvenient to use the conventional button type navigation key in an Internet mode and a game mode, which requires quick and minute direction control.

BRIEF SUMMARY OF THE INVENTION

The present invention solves the above problems by providing an input device and a mobile communication device that can implement various user interfaces and also improve ease of manipulation.

According to principles of the present invention, an input device is provided. The input device includes a first input unit configured to provide at least two directional signals, a second input unit located in the first input unit, the second input unit being configured to provide at least two directional signals different from the at least two directional signals of the first input unit, and a circuitry supporting substrate configured to receive a signal that is input through the first input unit and the second input unit.

In another aspect, the second input unit includes a pole configured to move in at least two directions, and a direction detection unit configured to detect movement of the pole.

In another aspect, the first input unit includes a panel that surrounds the second input unit, and a contact detection unit located on the circuitry supporting substrate. The contact detection unit is arranged to detect movement of the panel in at least two directions.

In a different aspect, the first input unit includes a panel configured to perform an input function when touched by a user, and a sensor located adjacent the panel. The sensor is configured to detect when the panel is touched by a user.

According to principles of the present invention, a mobile communication device is provided. The mobile communication device includes a body, a display located on the body, and an input device configured to control the display. The input device includes a first input unit configured to provide at least two directional signals, a second input unit located in the first input unit, the second input unit is configured to provide at least two directional signals different from the at least two directional signals of the first input unit, and a circuitry supporting substrate configured to receive a signal that controls the display that is input through the first input unit and the second input unit.

In a further aspect, the second input unit includes a pole configured to move in at least two directions, and a direction detection unit configured to detect movement of the pole. The second unit may be configured to perform a function corresponding to one of a confirmation key, a selection key, and a mode-switching key when pressed in an axial direction of the pole.

In still a further aspect, the direction detection unit may include one of a magnetic sensor and a plurality of dome switches.

In a different aspect, the first input unit is configured to perform at least two input operations, each input operation being associated with a different directional signal of the first input unit. The first input unit may include a panel that surrounds the second input unit, and a contact detection unit located on the circuitry supporting substrate. The contact detection unit may be arranged to detect movement of the panel in at least two directions.

In yet another aspect, the first input unit may be configured to perform an input operation when touched by a user. The first input unit may include a panel, and a sensor located adjacent the panel that is configured to detect when the panel is touched by a user.

In still another aspect, the first input unit may be configured to perform at least two input operations when pressed by a user and another input operation when touched by a user. The first input unit may include a panel that surrounds the second input unit, a contact detection unit located on the circuitry supporting substrate, the contact detection unit being arranged to detect movement of the panel in at least two directions when pressed by a user, and a sensor located adjacent the panel, the sensor being configured to detect when the panel is touched by a user. The second input unit may be configured to switch the first input unit between a first mode for performing an input operation when pressed by a user and a second mode for performing an input operation when touched by a user.

According to principles of the present invention, another mobile communication device is provided. The mobile communication device includes a body, a display located on the body, and an input device configured to control the display. The input device includes a first input unit configured to move in at least two directions, a second input unit located in the first input unit that is configured to move in at least two directions, and a circuitry supporting substrate configured to receive a signal that controls the display that is input through the first input unit and the second input unit. The second input unit includes a pole configured to move in the at least two directions, and a direction detection unit configured to detect movement of the pole. The first input unit includes a panel that surrounds the second input unit, and a contact detection unit located on the circuitry supporting substrate, the contact detection unit being arranged to detect movement of the panel in the at least two directions.

In a further aspect, the first input unit may include a sensor located adjacent the panel, and the sensor may be configured to detect when the panel is touched by a user.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Hereinafter, exemplary embodiments according to the present invention will be first described in detail with reference to FIGS. 1 to 4.

Figure 1:
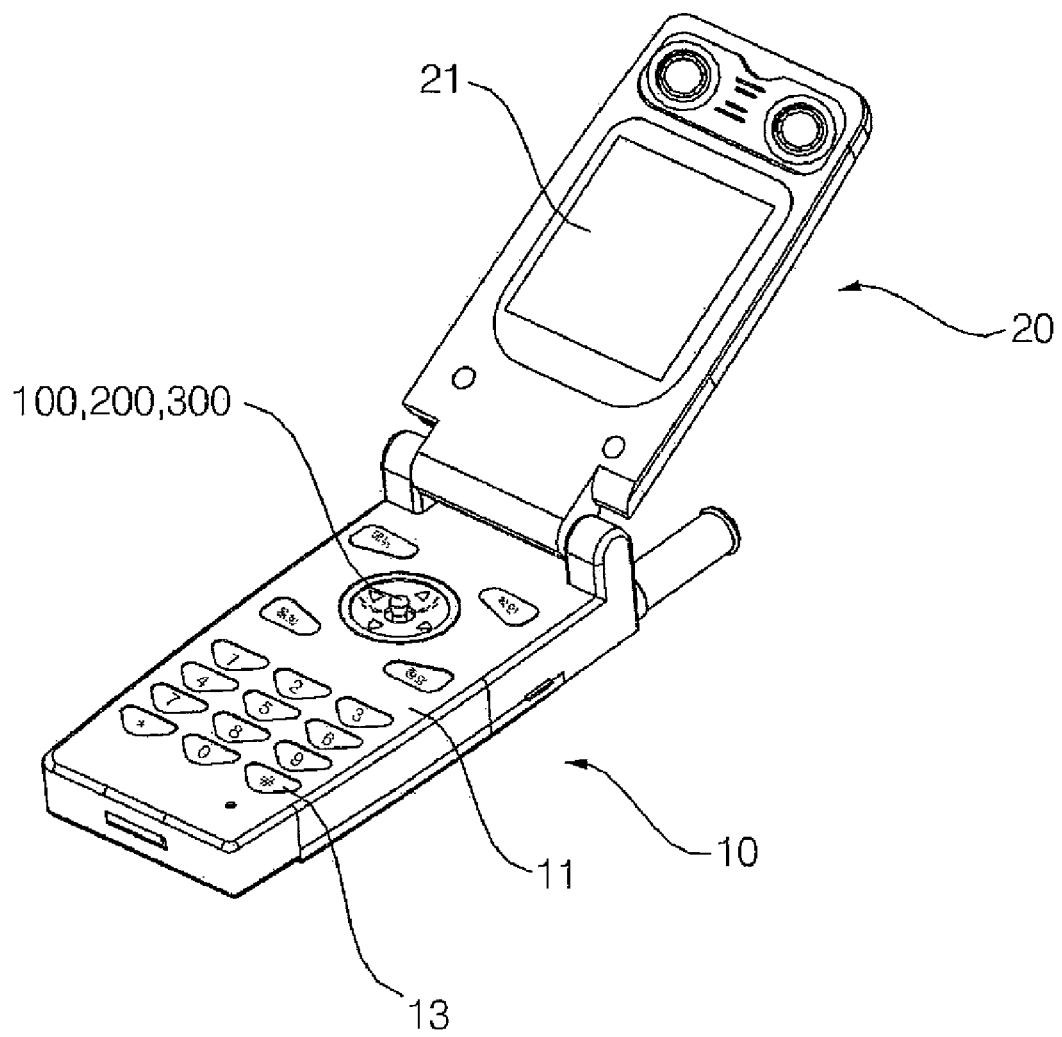
FIG. 1 is a perspective view of a mobile communication device according to an exemplary embodiment of the present invention.

FIG. 1 is a perspective view of a mobile communication device according to an exemplary embodiment of the present invention.

The mobile communication device shown in FIG. 1 is a folder type mobile phone, and includes a main body 10 and a folder body 20. In a front case 11 of the main body 10, one of input devices 100, 200, and 300 for inputting various information to a controller (not shown) and a plurality of button keys 13 are provided. The folder unit 20 includes a display unit 21 for displaying various visible information. While FIG. 1 shows a mobile communication device as a folding type phone, it is understood that the input device 100, 200, 300 are not limited to such use. For example, the input device 100, 200, 300 may also be provided in bar type phones, sliding type phones, combination of the various type phones, as well as in other mobile phones, PDAs and mobile PCs.

Figure 2:
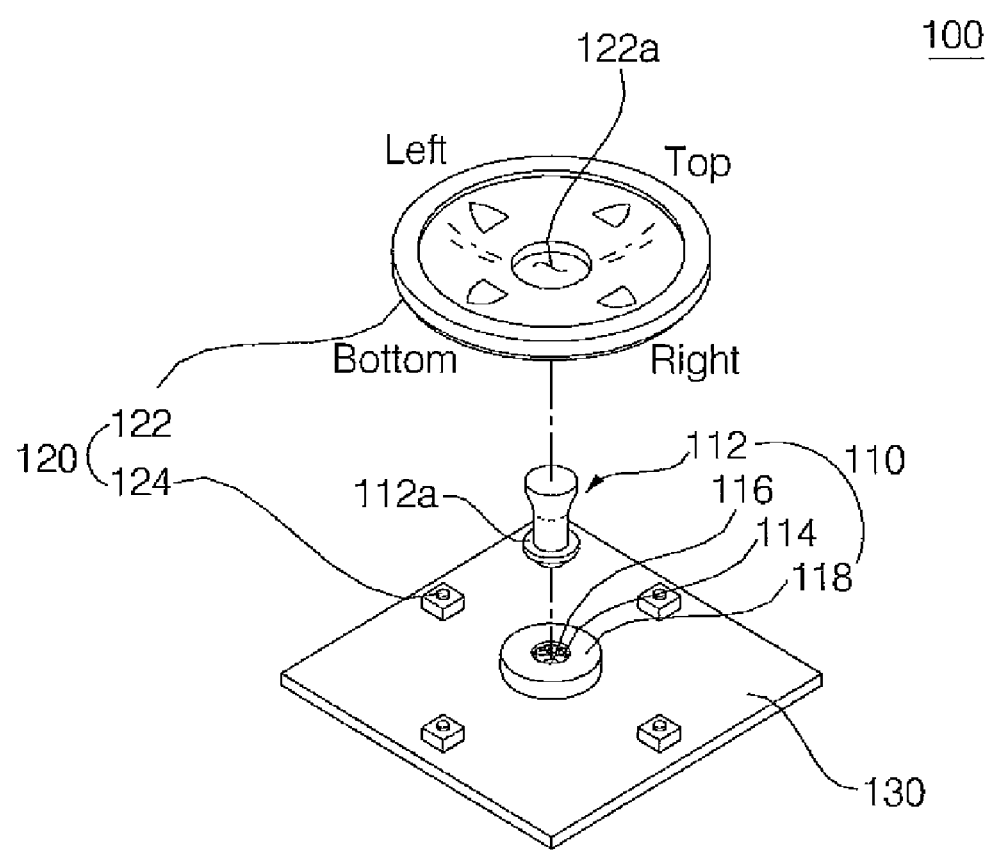
FIG. 2 is an exploded perspective view of an input device of a mobile communication device according to an exemplary embodiment of the present invention.
Figure 3:
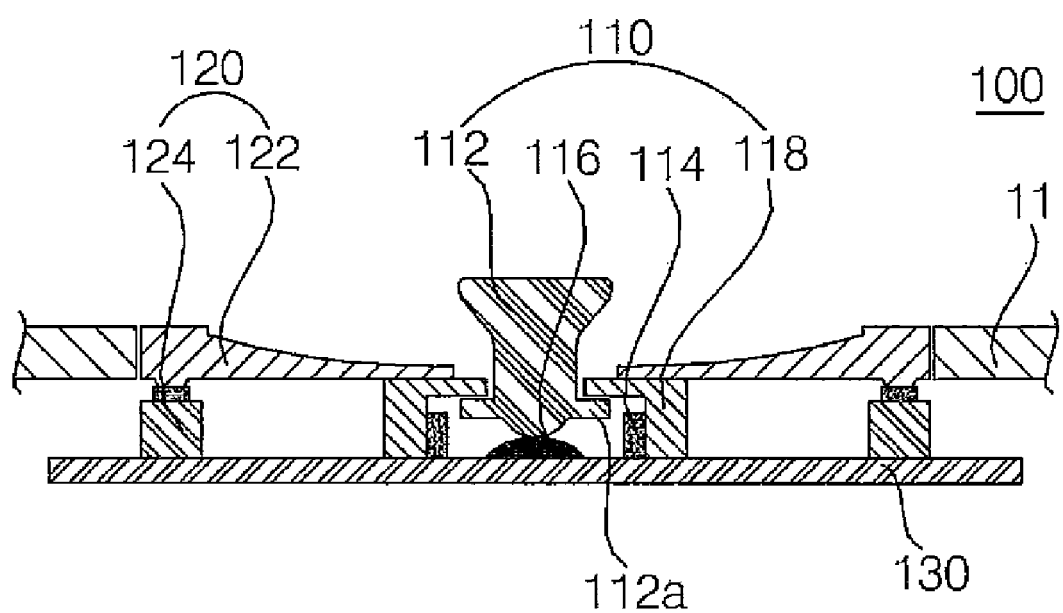
FIG. 3 is a cross-sectional view of the input device shown in FIG. 2.

FIG. 2 is an exploded perspective view of an input device 100 of a mobile communication device according to an exemplary embodiment of the present invention. FIG. 3 is a cross-sectional view of the input device 100 shown in FIG. 2.

Referring to FIGS. 2 and 3, the input device 100 includes a joystick unit 110 (second input unit) for performing an input operation in various directions including vertical, lateral, and diagonal directions by providing different directional signals to a controller (not shown). The input device 100 also includes a navigation key input unit 120 (first input unit) that is adjacently disposed to an outer circumference of the joystick unit 110 and is configured to perform at least two input operations using a press method, and a circuitry supporting substrate (CSS) 130, such as a printed circuit board, for receiving a signal that is input through the joystick unit 110 and the navigation key input unit 120.

The joystick unit 110 includes a pole 112 for manipulating in various directions including vertical, lateral, and diagonal directions, i.e. 360° direction and a direction detection unit 114 for detecting a manipulation direction of the pole 112.

The joystick unit 110 further includes a cylindrical frame unit 118 that is disposed at the center of the CSS 130. The frame unit 118 defines a space for inserting and manipulating the pole 112. A direction detection unit 114 for detecting a manipulation direction of the pole 112 is provided within the frame unit 118. A lower end of the direction detection unit 114 is electrically connected to the CSS 130 to transfer a manipulation direction of the pole 112 by manipulation of a user to the CSS 130.

The pole 112 is provided to be manipulated in 360° direction within the frame unit 118, and an upper end of the pole 112 has a height to be exposed above the navigation key input unit 120. A direction projection 112a extends outward at the side of the pole 112 so that a manipulation direction of the pole 112 may be detected by the direction detection unit 114. While the direction projection 112a is shown as an annular ring it may also be formed in segments divided into a plurality of pieces without detracting from the function of the direction projection.

In the present exemplary embodiment, the direction detection unit 114 includes a magnetic sensor divided into 8 pieces at the inside of the frame unit 118, for sensing 8 directions of vertical, lateral, and diagonal directions, and the direction projection 112a corresponding to the magnetic sensor is made of a magnetic substance capable of being sensed by the magnetic sensor. When the pole 112 is leaned toward a specific direction by the user, the direction projection 112a made of the magnetic substance is approached to the direction detection unit 114 including the magnetic sensor divided into 8 pieces, and the direction detection unit 114 detects a manipulation direction of the pole 112 and transfers the corresponding signal to the CSS 130.

While the joystick unit 110 has been described as capable of performing an input operation in 8 directions, the present invention is not limited thereto and can use a magnetic sensor divided into more pieces than 8 pieces or employ a different type of sensing system, thereby performing an input operation in more divided directions. Alternatively, the direction detection unit 114 of the joystick unit 110 may be embodied using a plurality of dome switches having a simple structure instead of a sensing system such as the magnetic sensor. In this case, each dome switch is disposed in a position corresponding to the direction projection 112a of the pole 112.

The joystick unit 110 further includes a dome switch 116 for performing a function corresponding to any one of a confirmation key, a selection key, a mode-switching key, or any other desirable function when the pole 112 is pressed downward in an axial direction of the pole 112. The dome switch 116 is disposed on the CSS 130 in a position corresponding to the pole 112. For example, the dome switch 116 may be provided in a space defined by the frame unit 118.

The navigation key input unit 120 includes a panel 122 disposed to surround the pole 112 and a contact detection unit 124 disposed on the CSS to detect the manipulation of the panel 122.

As shown in the exemplary embodiment, the panel 122 may be a circular plate, which is supported by an upper end of the frame unit 118, and has vertical and lateral sides to be pressed down towards the CSS 130. At the center of the panel 122, a central hole 122a is formed to receive the pole 112 and to expose the pole 112 to the outside. Further, an upper surface of the panel 122 has a concave central portion so as not to prevent the direction manipulation toward vertical and lateral sides of the panel 122 by the pole 112. In addition, arrows for indicating vertical and lateral directions are displayed on the upper surface of the panel 122, as shown in FIG. 2.

Four contact detection units 124 are disposed on the CSS 130 corresponding to vertical and lateral sides of the panel 122. That is, four contact detection units 124 are disposed on and spaced at an interval of 90° on the CSS 130. When the vertical and lateral sides of the panel 122 are pressed down by the user, the contact detection units 124 perform a function of transferring the corresponding signal to the CSS 130.

As seen in FIGS. 2 and 3, a general touch switch can be used as the contact detection unit 124; however, any switch for detecting the movement of the panel 122 and transferring a direction signal to the CSS 130 may be used. For example, as the contact detection unit 124, a dome switch may be used.

Figure 4:
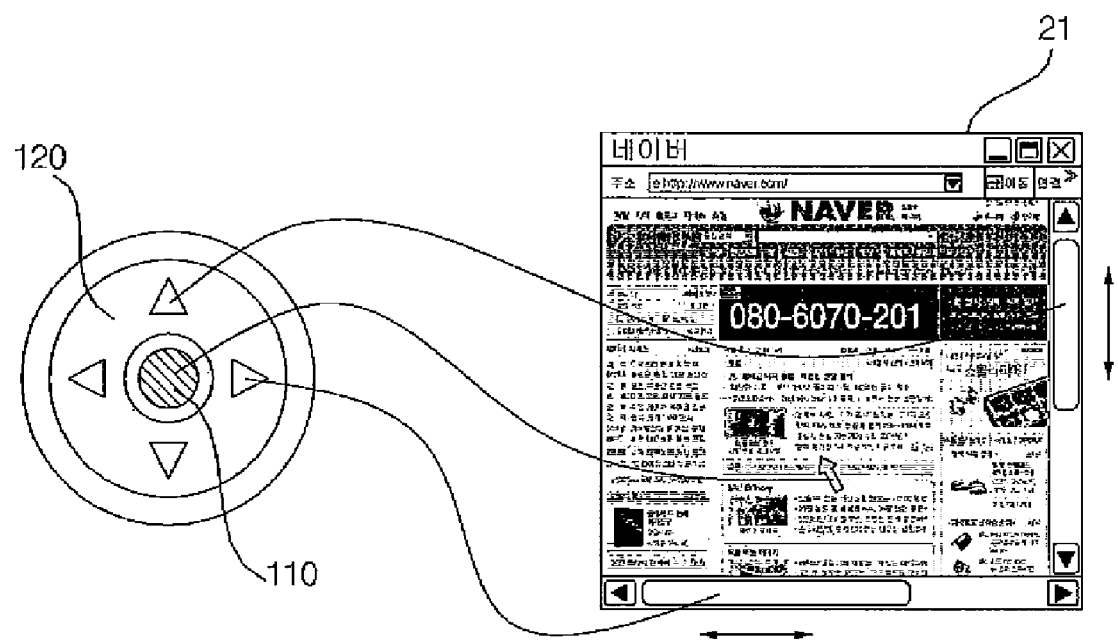
FIG. 4 is a schematic view illustrating an example of using the input device shown in FIG. 2 in an Internet mode.

FIG. 4 is a schematic view illustrating an example of using the input device 100 in an Internet mode.

Referring to FIG. 4, the joystick unit 110 disposed within the input device 100 performs a function of controlling a direction of a cursor displayed on web contents, and the navigation key input unit 120 disposed at the outside of the input device 100 performs a vertical and lateral scroll control function on web contents. Further, the joystick unit 110 enables a user to click on desired web contents.

Because the input device 100 is divided into two independent input means of the joystick unit 110 and the navigation key input unit 120, the direction control of a curse displayed in the display unit can be allocated to the joystick unit 110 for performing an input operation in various directions including vertical, lateral, and diagonal directions. Accordingly, the input device 100 can perform quick and convenient direction control in an Internet mode and a game mode.

Particularly, because the display unit of the mobile communication device has a size much smaller than a monitor of a computer, a scroll function is frequently used during an Internet search, whereby the input device 100 can allocate a vertical and lateral scroll function to the navigation key input unit 120, thereby providing excellent manipulation response.

The input device 100 can be embodied with a user interface of various combinations such as an Internet mode, a game mode, and a camera mode in addition to the example shown in FIG. 4. Furthermore, while a particular web page has been shown, it is merely illustrative of the control functions attributed to the input device 100.

Hereinafter, another exemplary embodiment of the present invention will be described in detail with reference to FIGS. 5 and 6.

Figure 5:
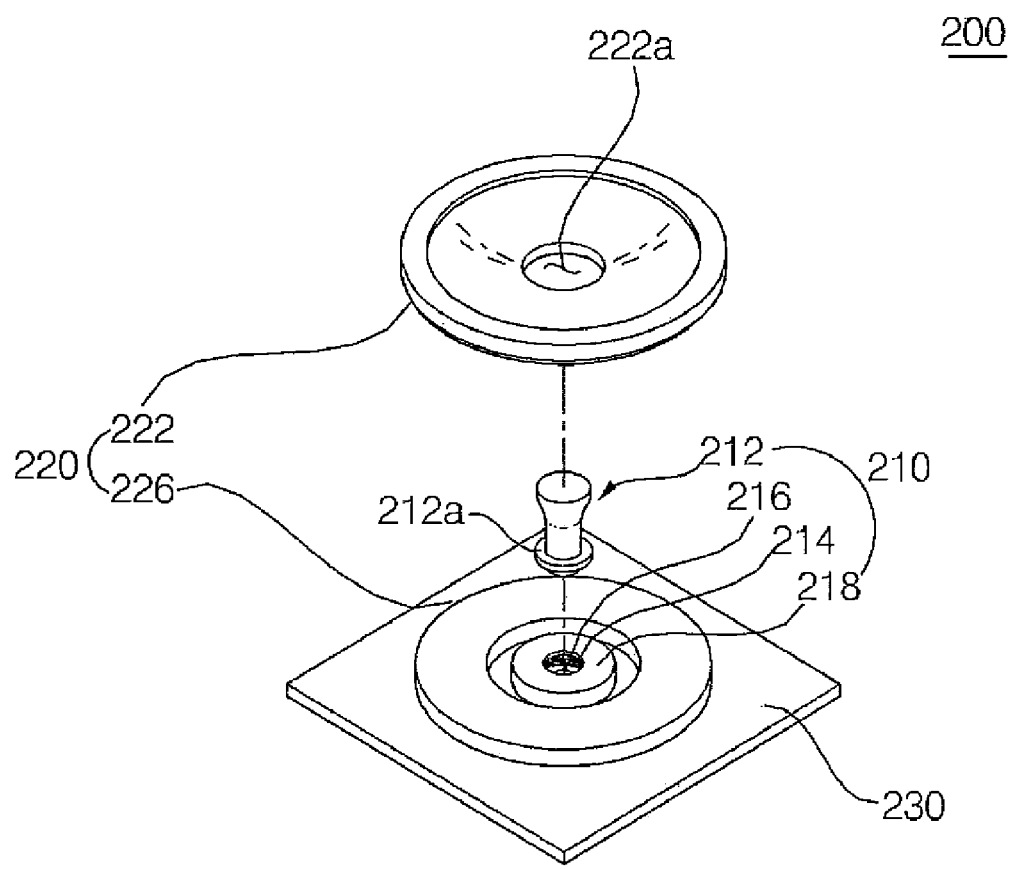
FIG. 5 is an exploded perspective view of an input device of a mobile communication device according to another exemplary embodiment of the present invention.
Figure 6:
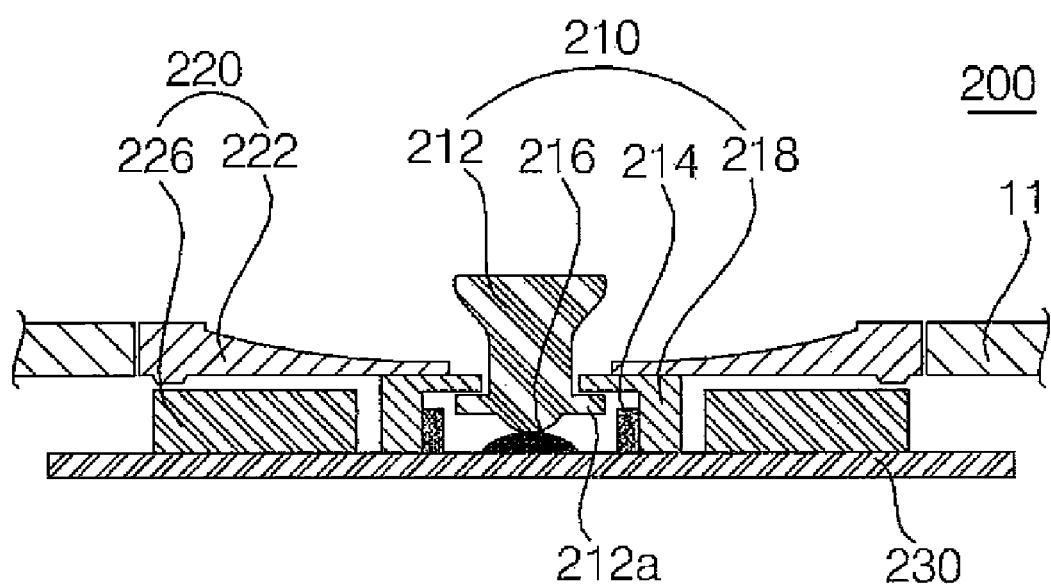
FIG. 6 is a cross-sectional view of the input device shown in FIG. 5.

FIG. 5 is an exploded perspective view of an input device 200 of a mobile communication device according to another exemplary embodiment of the present invention. FIG. 6 is a cross-sectional view of the input device 200 shown in FIG. 5.

The configuration of the input device 200 is substantially identical to that of the input device 100 shown in FIG. 2, except that a navigation key input unit 220 performs an input operation using a touch or sensing method, therefore similar reference numerals have been used to designate substantially identical elements, and descriptions thereof will be briefly described.

The input device 200 includes a joystick unit 210 configure to perform an input operation in various directions including vertical, lateral, and diagonal directions by providing different directional signals to a controller (not shown). The input device 100 also includes a navigation key input unit 220 that is adjacently disposed to an outer circumference of the joystick unit 210 and is configured to perform an input operation using a touch method, and a CSS 230 for receiving a signal that is input through the joystick unit 210 and the navigation key input unit 220.

The joystick unit 210 includes a pole 212 configured to be manipulated in various directions including vertical, lateral, and diagonal directions, i.e. 360° direction and a direction detection unit 214 for detecting a manipulation direction of the pole 212. The joystick unit 210 further includes a dome switch 216 for performing a function corresponding to any one of a confirmation key, a selection key, a mode-switching key, or any other desirable function when the pole 212 is pressed downward in an axial direction of the pole 212. The dome switch 216 is disposed on the CSS 230 in a position corresponding to the pole 212.

The navigation key input unit 220 includes a panel 222 that is disposed to surround the pole 212 and a sensor 226 that is disposed on the CSS 230 to sense a signal changing when the user's finger contacts the panel 222. That is, the navigation key input unit 220 performs an input operation using a touch method. Here, the touch method may include a touch screen method widely used in various terminals and a touch wheel method similar to that utilized by an iPod product of the Apple company. Both methods can be used in selecting a menu with a soft touch of a finger.

The sensor 226 has a cylindrical shape to surround a circumference of a frame unit 218, and uses a pressure detection sensor for sensing an input direction using the pressure change generating when the user's finger contacts with an upper surface of the panel 222 or uses a static electricity detection sensor for sensing an input direction using the static electricity change generated when the user's finger contacts with the upper surface of the panel 222. While two specific types of sensors for providing a touch method have been described, it is understood that any type sensor suitable for use in a touch method can be applied to the present invention.

The navigation key input unit 220 using the touch method can perform a scroll function in an Internet mode. That is, as the user's finger contacts with the upper surface of the panel 222 and rotates the upper surface in a vertical or lateral direction, a vertical or lateral scroll function can be embodied in an Internet mode.

Hereinafter, another exemplary embodiment of the present invention will be described in detail with reference to FIGS. 7 and 8.

Figure 7:
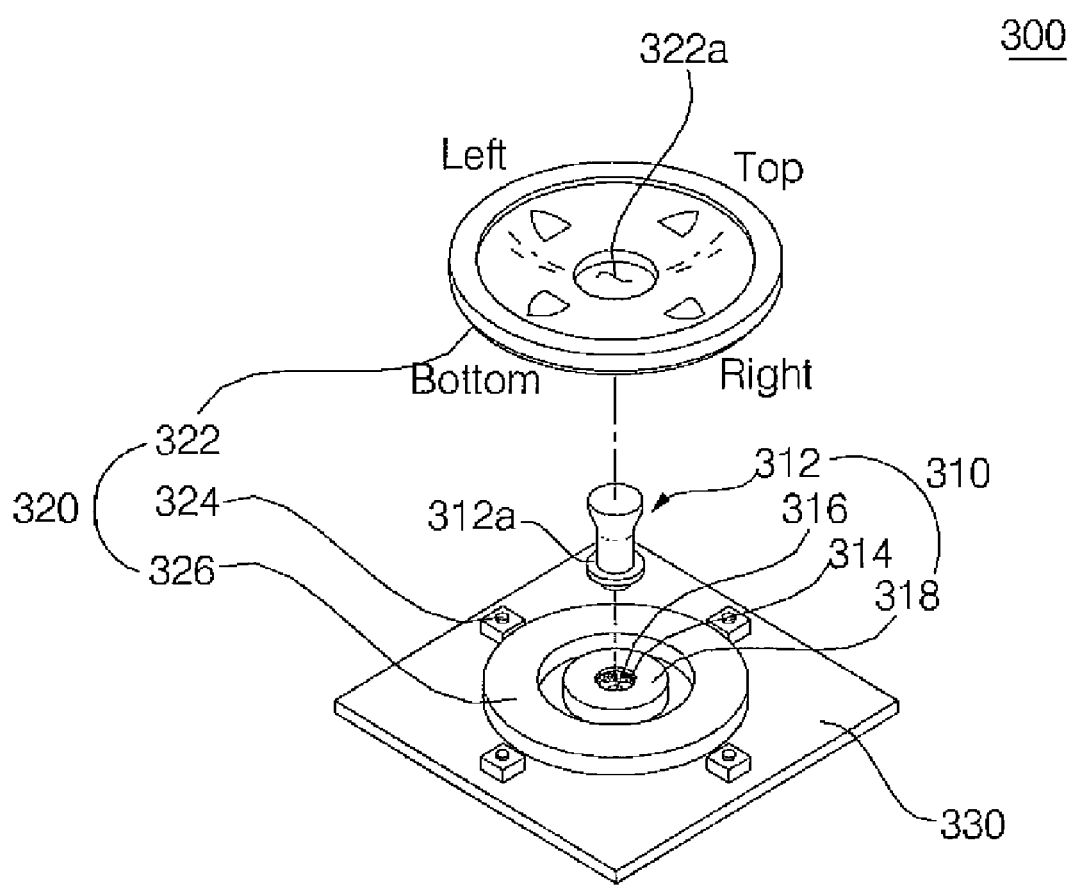
FIG. 7 is an exploded perspective view of an input device of a mobile communication device according to another exemplary embodiment of the present invention.
Figure 8:
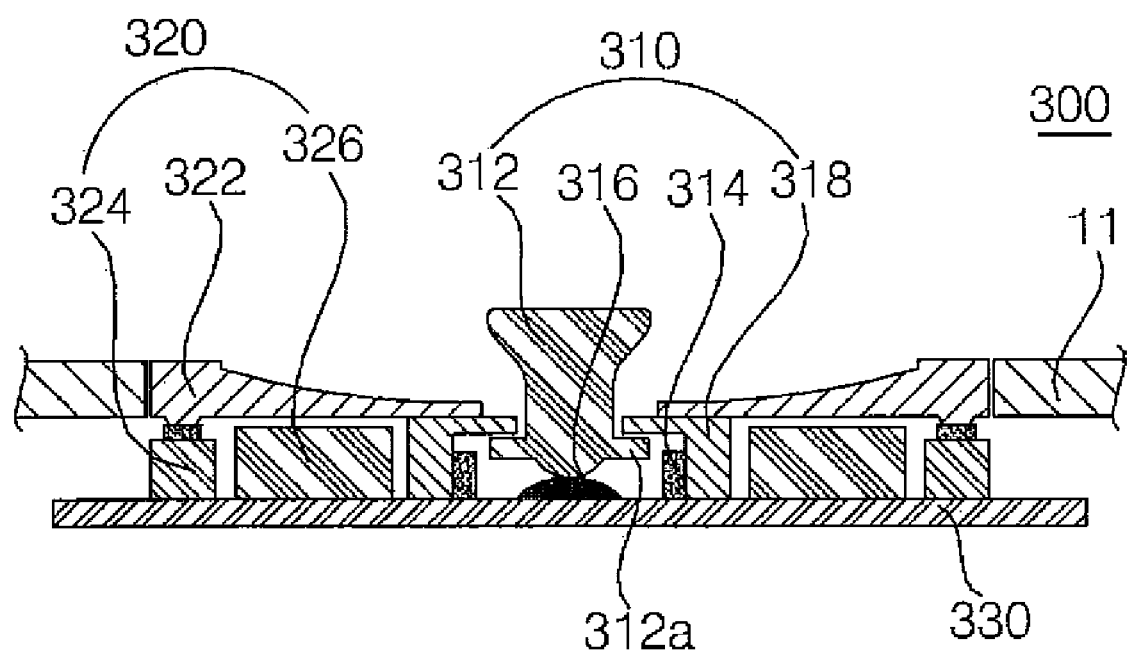
FIG. 8 is a cross-sectional view of the input device shown in FIG. 7.

FIG. 7 is an exploded perspective view of an input device 300 of a mobile communication device according to another exemplary embodiment of the present invention. FIG. 8 is a cross-sectional view of the input device 300 shown in FIG. 7.

The configuration of the input device 300 is substantially identical to that of the input device 100 shown in FIG. 2, except that a navigation key input unit 320 performs an input operation using both a press method and a touch method, therefore similar reference numerals designating substantially identical elements have been used, and descriptions thereof will be briefly described.

The input device 300 includes a joystick unit 310 configured to perform an input operation in various directions including vertical, lateral, and diagonal directions by providing different directional signals to a controller (not shown). The input device 100 also includes a navigation key input unit

320 that is adjacently disposed to an outer circumference of the joystick unit 310 and is configured to perform at least two input operations with a pressing method and an input operation with a touching method, and a CSS 330 for receiving a signal that is input through the joystick unit 310 and the navigation key input unit 320.

The joystick unit 310 includes a pole 312 configured to be manipulated in various directions including vertical, lateral, and diagonal directions, i.e. 360° direction and a direction detection unit 314 for detecting a manipulation direction of the pole 312. The joystick unit 310 further includes a dome switch 316 for performing a function corresponding to any one of a confirmation key, a selection key, a mode-switching key, or any other desirable function when the pole 312 is pressed downward in the axial direction of the pole 312. The dome switch 316 is disposed on the CSS 330 in a position corresponding to the pole 312.

The navigation key input unit 320 includes a panel 322 that is disposed to surround the pole 312 and that has vertical and lateral sides to be pressed down towards the CSS 330, four contact detection units 324 that are disposed in a position on the CSS 330 corresponding to vertical and lateral sides of the panel 322 to detect the manipulation of the panel 322, and a sensor 326 that is disposed on the CSS 330 to detect a signal changing when the user's finger contacts the panel 322. The sensor 326 may be disposed between the frame unit 318 and the four contact detection units 324, as shown in FIG. 7.

Because the navigation key input unit 320 can perform both the input operation using a pressing method according to the exemplary embodiment shown in FIG. 2 and the input operation using a touching method according to the exemplary embodiment shown in FIG. 5, interfaces of various combinations can be embodied.

The joystick unit 310 can also be used as a mode switching key for performing the switch between a first mode (a direction key mode) of performing an input operation with only a pressing method in the navigation key input unit 320 and a second mode (a touch mode) of performing an input operation with only a touching method in the navigation key input unit 320. This can prevent the user's confusion that may be generated by mixing a press method and a touch method in a specific mode. Particularly, a user unfamiliar with a touch method can use the navigation key input unit 320 with only a press method.

As described above, an input device of a mobile communication device according to the present invention includes two independent input means of a joystick unit and a navigation key input, thereby embodying various user interfaces and improving manipulation response.

The embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. An input device, comprising:
   a first input unit configured to provide at least two directional signals;
   a second input unit located in the first input unit, the second input unit being configured to provide at least two directional signals different from the at least two directional signals of the first input unit; and
   a circuitry supporting substrate configured to receive a signal that is input through the first input unit and the second input unit,
   wherein the first input unit includes:
      a panel that surrounds the second input unit, the panel configured to register both a pressing input and a touching input;
      a contact detection unit located on the circuitry supporting substrate, the contact detection unit being arranged to detect movement of the panel in at least two directions due to a pressing input; and
      a touch sensor located adjacent the panel, the sensor being configured to detect when the panel is touched by a user.

2. The input device according to claim 1, wherein the second input unit includes:
   a pole configured to move in at least two directions; and
   a direction detection unit configured to detect movement of the pole.

3. The input device according to claim 2, wherein the direction detection unit includes a magnetic sensor.

4. The input device according to claim 3, wherein the magnetic sensor is arranged in a ring-shape, and the pole includes a direction projection extending towards the magnetic sensor.

5. The input device according to claim 4, wherein the touch sensor is ring-shaped, and both the magnetic sensor and touch sensor are arranged concentrically about an axis defined by the pole.

6. A mobile communication device comprising:
   a body;
   a display located on the body; and
   an input device configured to control the display, the input device including:
      a first input unit configured to provide at least two directional signals;
      a second input unit located in the first input unit, the second input unit being configured to provide at least two directional signals different from the at least two directional signals of the first input unit; and
      a circuitry supporting substrate configured to receive a signal that controls the display that is input through the first input unit and the second input unit,
      wherein the first input unit includes:
         a panel that surrounds the second input unit, the panel configured to register both a pressing input and a touching input;
         a contact detection unit located on the circuitry supporting substrate, the contact detection unit being arranged to detect movement of the panel in at least two directions due to a pressing input; and
         a touch sensor located adjacent the panel, the sensor being configured to detect when the panel is touched by a user.

7. The mobile communication device according to claim 6, wherein the second input unit includes:
   a pole configured to move in at least two directions; and
   a direction detection unit configured to detect movement of the pole.

8. The mobile communication device according to claim 7, wherein the second unit is configured to perform a function corresponding to one of a confirmation key, a selection key, and a mode switching key when pressed in an axial direction of the pole.

9. The mobile communication device according to claim 7, wherein the direction detection unit includes one of a magnetic sensor and a plurality of dome switches.

10. The mobile communication device according to claim 7, wherein the direction detection unit includes a magnetic sensor.

11. The mobile communication device according to claim 10, wherein the magnetic sensor is arranged in a ring-shape, and the pole includes a direction projection extending towards the magnetic sensor.

12. The mobile communication device according to claim 11, wherein the touch sensor is ring-shaped, and the magnetic sensor and touch sensor are arranged concentrically about an axis defined by the pole.

13. The mobile communication device according to claim 6, wherein the first input unit is configured to perform at least two input operations, each input operation being associated with a different directional signal of the first input unit.

14. The mobile communication device according to claim 6, wherein the first input unit is configured to perform at least two input operations when pressed by a user and another input operation when touched by a user.

15. The mobile communication device according to claim 6, wherein the second input unit is configured to switch the first input unit between a first mode for performing an input operation when pressed by a user and a second mode for performing an input operation when touched by a user.

16. A mobile communication device comprising:
a body;
a display located on the body; and
an input device configured to control the display, the input device including:
a first input unit configured to move in at least two directions;
a second input unit located in the first input unit, the second input unit being configured to move in at least two directions, the second input unit including:
a pole configured to move in the at least two directions; and
a direction detection unit configured to detect movement of the pole; and
a circuitry supporting substrate configured to receive a signal that controls the display that is input through the first input unit and the second input unit,
wherein the first input unit includes:
a panel that surrounds the pole;
a contact detection unit located on the circuitry supporting substrate, the contact detection unit being arranged to detect movement of the panel in the at least two directions by contact of the panel with the contact detection unit; and
a ring-shaped touch sensor located beneath the panel, the sensor being configured to detect when the panel is touched by a user.

17. The mobile communication device according to claim 16, further comprising three additional contact detection units, each contact detection unit being equally spaced from the pole in a radial direction.

18. The mobile communication device according to claim 17, wherein the ring-shaped touch sensor is located between the contact detection units and the pole.

19. The mobile communication device according to claim 18, wherein the direction detection unit includes a ring-shaped magnetic sensor.

20. The mobile communication device according to claim 19, wherein the magnetic sensor and touch sensor are arranged concentrically about an axis defined by the pole.

* * * * *